Patented July 19, 1949

2,476,412

UNITED STATES PATENT OFFICE 2,476,412

PREPARING DRIED EGG PRODUCTS

Benjamin R. Harris, Chicago, Ill., assignor to The Emulsol Corporation, Chicago, Ill., a corporation of Illinois No Drawing. Application October 30, 1947, Serial No. 783,231

10 Claims. (Cl. 99—210)

My invention relates to the preparation of dried egg products, such as whole eggs, that is, eggs containing whites and yolks in their natural proportions, mixtures of yolks and whites in which the proportions of yolks are greater than those usually present in whole eggs, mixtures containing substantially yolks with lesser proportions of whites, and so-called commercial yolks which contain varying proportions of adhering whites, and mixtures of yolks and white containing substantial proportions of yolks, of the order of 10% or more.

Numerous attempts have heretofore been made to market commercially dried whole eggs, dried yolks, and the like, particularly for use in the baking and confectionery industry. These efforts did not prove successful despite the fact that, as against frozen whole eggs or frozen yolks, the dried egg products offered numerous advantages from the standpoint of economy of production, packaging container cost, shipping and storage, keeping qualities of the products, and simplicity of handling. Thus, although the costs involved in storing, handling and shipping dried eggs are much less than in the case of frozen eggs, and various other advantages are present in the manufacture, merchandising and using of dried eggs over frozen eggs, the development of a dried egg industry, as applied to whole eggs or mixed eggs having a substantial portion of yolks, has failed to materialize.

This has been due essentially to the fact that, as is well understood by those versed in the art, no one has heretofore succeeded in producing a dried whole egg product which is equivalent or substantially equivalent in quality and utility, or, in other words, performance, to either fresh whole eggs or frozen whole eggs. It has been recognized by those skilled in the art that the drying procedure, even though conducted at temperatures below those at which the proteins were presumably rendered insoluble, nevertheless caused a breakdown or deterioration in the colloidal structure of the whole eggs with the concomitant result that the dried product obtained was unsatisfactory, particularly where it was sought to be used in the baking industry for the preparation of cakes and the like. The dried whole eggs not only were reconstituted with difficulty, and underwent deterioration even under relatively favorable conditions of storage, but, in addition, they failed to produce results, when used in baking, comparable in character to those obtained with fresh whole eggs or frozen whole eggs.

I have discovered a novel method of treating liquid whole eggs and like egg products, as hereinafter described and defined, whereby the disadvantages which were heretofore unavoidable are overcome and novel products are produced having excellent properties not present in dried whole egg products previously known.

In accordance with my invention, liquid whole eggs, for example, are fermented, being preferably inoculated with a microbiological culture, especially of acid-forming organisms, the organisms are allowed to incubate for a length of time sufficient to alter the colloidal characteristics of the liquid whole eggs, and then the resulting egg product is dried, preferably spray dried. I prefer to pasteurize the eggs prior to inoculating the same with the microbiological culture and, in some cases, pasteurizing the eggs after treatment with the culture but prior to drying.

The exact action of the microbiological culture on the liquid whole egg material is not fully known. The action appears to bring about changes in the protein and other constituents of the yolk-white mixture the result of which is to alter the colloidal characteristics of the eggs and thereby materially to affect the ultimate properties and utility of the final dried product. In this general connection, it may be pointed out that my present invention is to be sharply distinguished from processes which have heretofore been employed for the treatment of liquid egg whites. The presence of the substantial proportions of egg yolk as, for example, in whole eggs, brings about certain changes, by the action of the microbiological culture, which are peculiar to the presence of certain constituents in the egg yolk which have no counterpart in egg whites per se and which manifest themselves in the character of the ultimately obtained product.

The microbiological cultures which I use to inoculate the liquid eggs may be of varying types, those of alcohol- or acid-producing character, particularly the latter, being most suitable. The acid-forming organisms may be of the type which, in their life processes, produce different acids as, for example, lactic or other organic acid, especially preferred being those which produce lactic acid. Such cultures and alcohol-forming and acid-forming organisms are well known to bacteriologists and others versed in the art. They are conventionally used in the fermenting of egg whites as see, for example, U. S. Patents Nos. 1,818,214; 2,056,082; 2,168,926 and 2,280,147, and descriptions of such organisms or cultures which are capable of producing acids or alcohol from sugars, present in eggs, may be found in any standard work on bacteriology as, for example, Industrial Microbiology by Smyth and Obold, published in 1930 by The Williams & Wilkins Company, Baltimore, Maryland. The amount of culture is not critical but, on the contrary is widely variable and follows conventional practice in the fermentation arts, particularly the art of fermenting egg whites. It depends, for example, as is well known, upon the viability of the particular organisms being employed and upon the number of the organisms per cc. of culture or the like. I may also, in certain instances, use mixtures of different cultures as, for example, mixtures of lactic and alcoholic cultures. I may also add sugar, milk or other nutrient material to the liquid egg material prior to or during or after incubation with the culture. It will be understood that the pH of the liquid eggs will be adjusted, if necessary, dependent upon the character of the culture utilized, so that the fermentation may proceed under conditions most favorable for the development or growth of the particular organisms involved without causing putrefaction.

In order that those skilled in the art may even more fully understand the nature of my invention, I give the following examples as illustrative thereof. It will be understood that various changes may be made, within limits, with respect to the egg yolk content of the liquid eggs, with respect to the nature of the microbiological culture, the inclusion or exclusion of pasteurization treatments and the temperature thereof, and the like, without departing from the guiding principles which I have disclosed herein. The period of incubation is also variable. In general, it should be carried out until a proportion of the free sugars which as is well known comprise reducing sugars, or added sugars, are fermented, but it should be stopped at a point where the sugars just disappear or preferably just before all of the free sugars disappear and putrefaction begins. In the usual case, from about 12 hours to about 72 hours will be found to be suitable.

Example 1000 pounds of fresh liquid whole eggs, with the yolk sacks thoroughly broken up, are preliminarily pasteurized at a temperature of about 135 degrees F. for about 1 hour and then placed in a vat and cooled. The pH of the eggs is adjusted to about 6.5 and a culture of lactic-acid forming bacteria is added thereto. After standing for about 30 hours at approximately room temperature, the pH is adjusted to 7.0, the eggs are again pasteurized, and the resulting product is dried in any suitable manner as, for example, by pan drying or spray drying, care being used to avoid coagulation of proteins.

Prior to drying, a small percentage of a non-colloidal material, such as sugar or salt, may be added to the liquid egg. This results in facilitating reconstitution of the dried egg product when water is added thereto. In general, from about 0.25% to about 4% of the non-colloidal material may be added to the treated liquid egg material prior to drying the same.

Instead of using fresh liquid whole eggs, I may employ frozen whole eggs, thawing out the same before treatment thereof in accordance with my invention, or I may utilize commercial yolks or mixtures of yolks and whites containing greater proportions of yolks than are present in the natural eggs.

The term "liquid eggs," as used in the claims, unless the connotation otherwise expressly indicates, will be understood to mean liquid whole eggs, mixtures of yolks and whites in which the proportion of yolk to white is greater than in the natural egg, yolk material containing adhering whites in little or somewhat larger proportions as, for example, in so-called commercial yolk, and mixtures of yolks and whites containing substantial proportions of yolks, of the order of 10% or more.

The essential novelty of the present invention is predicated upon the new and useful results emanating from fermenting a mixture of such liquid eggs, as distinguished from the usual practice of fermenting egg whites, the fermentation being carried out, as previously stated, until a proportion of the free sugars are fermented but is stopped at a point where the sugars just disappear or just before all of the free sugars disappear. Such details as selection of cultures and amounts thereof are not critical, are capable of wide variation, and are conventional and well known to those versed in the art.

The present application is a continuation-in-part of my prior application Serial No. 422,877, filed December 13, 1941, now abandoned.

What I claim as new and desire to protect by Lettters Patent of the United States is:

1. A process for preparing dried egg products comprising inoculating a mixture of egg yolks and whites with a culture of organisms which feed upon reducing sugars, fermenting the inoculated mixture, and drying the fermented mixture.

2. A process for preparing dried egg products comprising inoculating a mixture of egg yolks and whites with a culture of an acid-forming bacteria, fermenting the inoculated mixture, and drying the fermented mixture.

3. A process for preparing dried egg products comprising removing the shells from a quantity of eggs, to a mixture of yolks and whites of said eggs adding a culture of an acid-forming bacteria, fermenting the mixture under the influence of said organisms, and drying the fermented egg mixture.

4. A process as called for in claim 2 wherein said acid-forming organism is a lactic acid producing organism.

5. A process as in claim 1 wherein said fermented mixture is dried within 24 hours after said inoculation.

6. A process for preparing dried egg products comprising pasteurizing a quantity of egg yolks and whites, inoculating a mixture of said yolks and whites with a culture of an organism which feeds upon reducing sugars, fermenting the inoculated mixture, and drying the fermented mixture.

7. In a process for preparing dried egg products the step of fermenting an egg mixture containing yolks and whites which mixture has been inoculated with an organism which feeds upon reducing sugar.

8. In a process for preparing dried egg products the step of fermenting an egg mixture containing yolks and whites which mixture has been inoculated with an acid-forming organism which feeds upon reducing sugar.

9. A process for preparing dried egg products comprising inoculating a mixture of egg yolks and whites with a culture of acid-forming bacteria, fermenting the inoculated mixture for at least 12 hours but discontinuing said fermentation before all of the free sugars disappear, and drying the fermented mixture.

10. A process for preparing dried egg products comprising pasteurizing a quantity of egg yolks and whites, inoculating a mixture of said yolks and whites with lactic acid-forming bacteria, fermenting the inoculated mixture for at least 12 hours but discontinuing said fermentation before all of the free sugars disappear, and drying the fermented mixture.

BENJAMIN R. HARRIS.

REFERENCES CITED

The following references are of record in the file of this patent:

UNITED STATES PATENTS

| Number | Name | Date |
|---|---|---|
| 2,427,726 | Hopkins et al. | Sept. 23, 1947 |